Figure 1A:
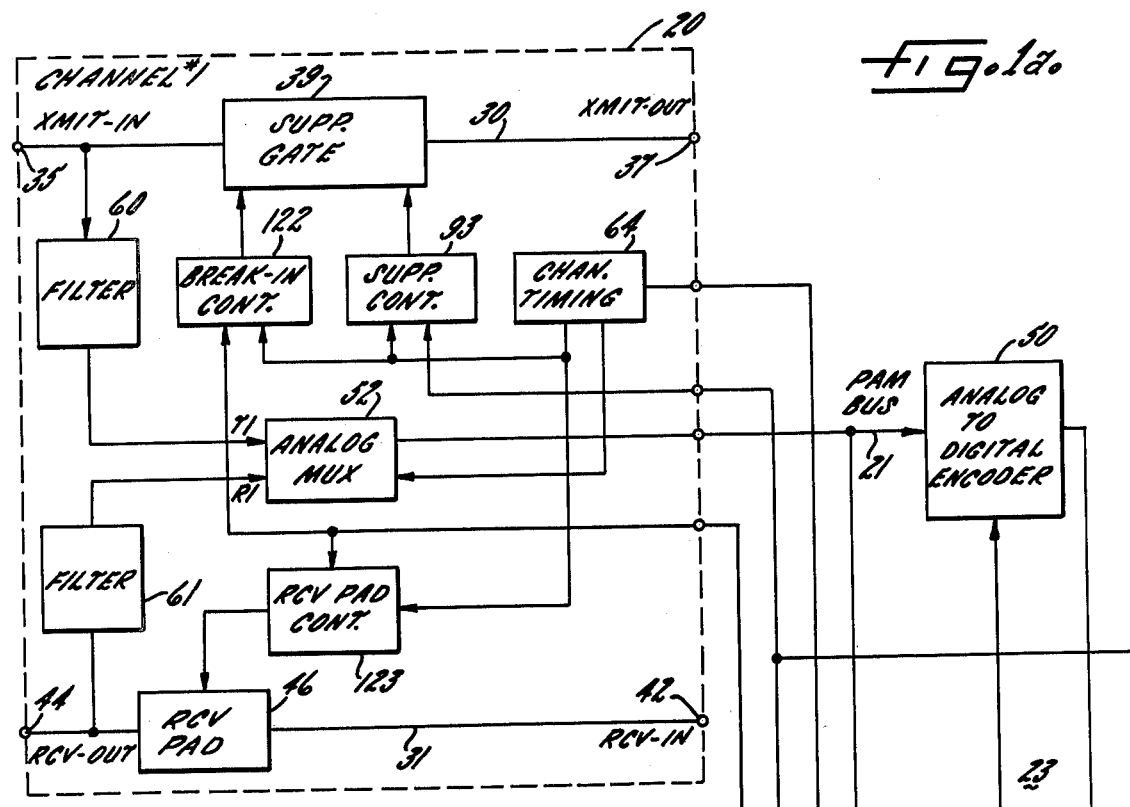
Figure 1A:
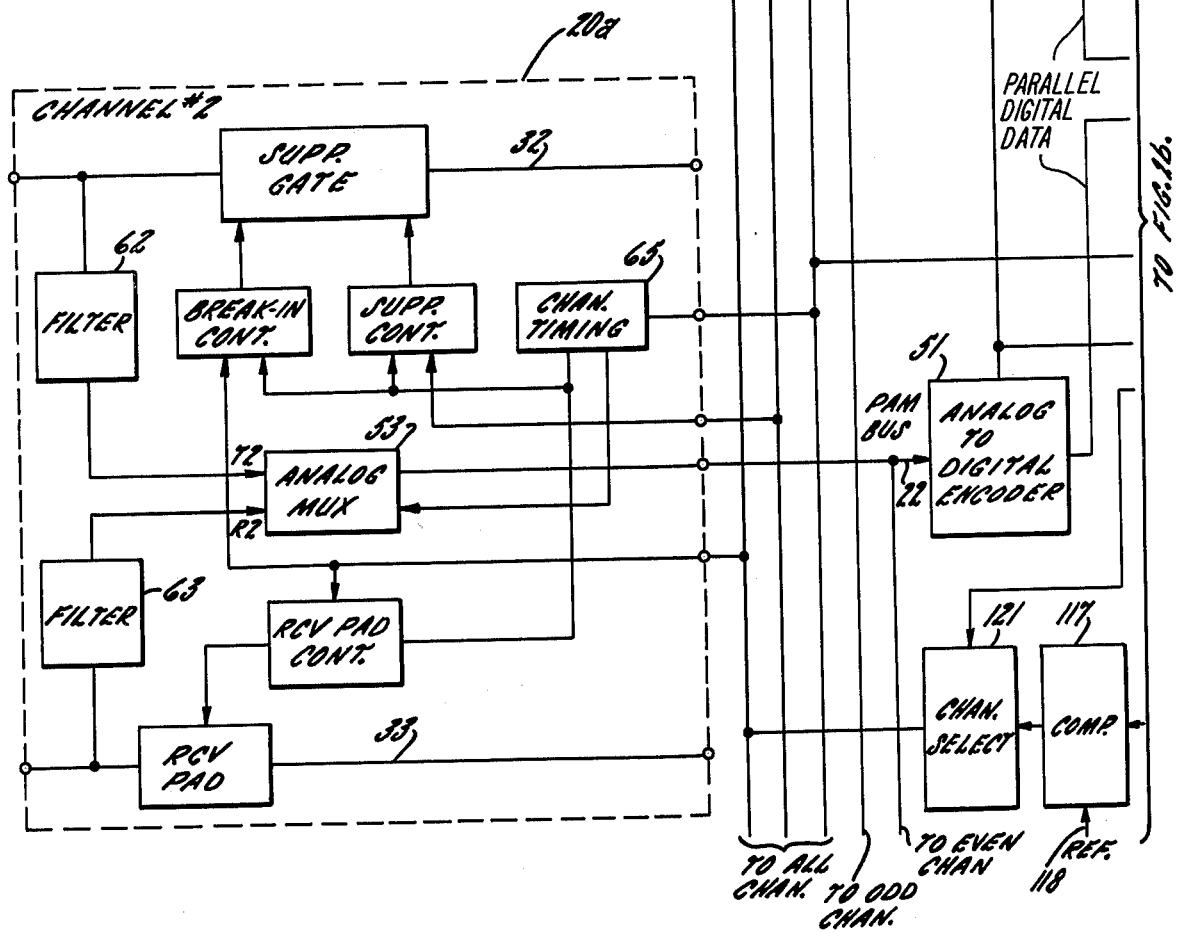

United States Patent [19]

Gupta et al.

[11] 4,088,851
[45] May 9, 1978

[54] DIGITAL ECHO SUPPRESSOR

[75] Inventors: Shanti S. Gupta, Naperville; Vijaya K. Bhatnagar, Bolingbrook; John F. Litster, Naperville, all of Ill.

[73] Assignee: Wescom, Inc., Downers Grove, Ill.

[21] Appl. No.: 681,055

[22] Filed: Apr. 28, 1976

[51] Int. Cl.² .............................................. H04B 3/20
[52] U.S. Cl. ................................ 179/170.2; 179/170.6
[58] Field of Search ............. 179/15 AS, 170.2, 170.6, 179/170.8; 364/733, 734; 235/92 SH

[56] References Cited

U.S. PATENT DOCUMENTS

| 3,562,448 | 2/1971 | May, Jr. ............................ 179/170.6 |
| 3,673,355 | 6/1972 | La Marche et al. ................ 179/170.6 |
| 3,823,275 | 7/1974 | La Marche et al. ................ 179/170.2 |
| 3,937,907 | 2/1976 | Campanella et al. .............. 179/170.2 |
| 4,051,332 | 9/1977 | Izumi et al. ....................... 179/170.2 |

Primary Examiner—Kathleen H. Claffy
Assistant Examiner—Randall P. Myers
Attorney, Agent, or Firm—Leydig, Voit, Osann, Mayer & Holt Ltd.

[57] ABSTRACT

A multi-channel digital echo suppressor wherein analog signals on a plurality of paired transmit and receive lines are sampled and digitized to form an interleaved sequence of parallel digital words. The interleaved digital words are accumulated for a predetermined period to form accumulated sample sums in sequence for each of the respective transmit and receive lines. Means are provided for segregating the receive channel accumulated samples from the transmit channel accumulated samples and bringing the samples for the respective channel pairs back into time correlation. The receive line accumulated samples are sequentially compared against a predetermined reference for producing suppression control signals which are routed to respective suppression controllers for the various channels. At the same time, the transmit line accumulated samples are compared against the time correlated receive line accumulated samples and to a predetermined reference to produce break-in control signals for each channel in sequence. The break-in control signals are monitored by a moving window scanner which selects and monitors the most recent eight break-in control signals for each channel in sequence and produces break-in operating signals when a majority of the samples in the window dictate break-in for that channel. The sequential break-in operating signals are distributed to break-in and receive pad controllers associated with the respective channels.

26 Claims, 2 Drawing Figures

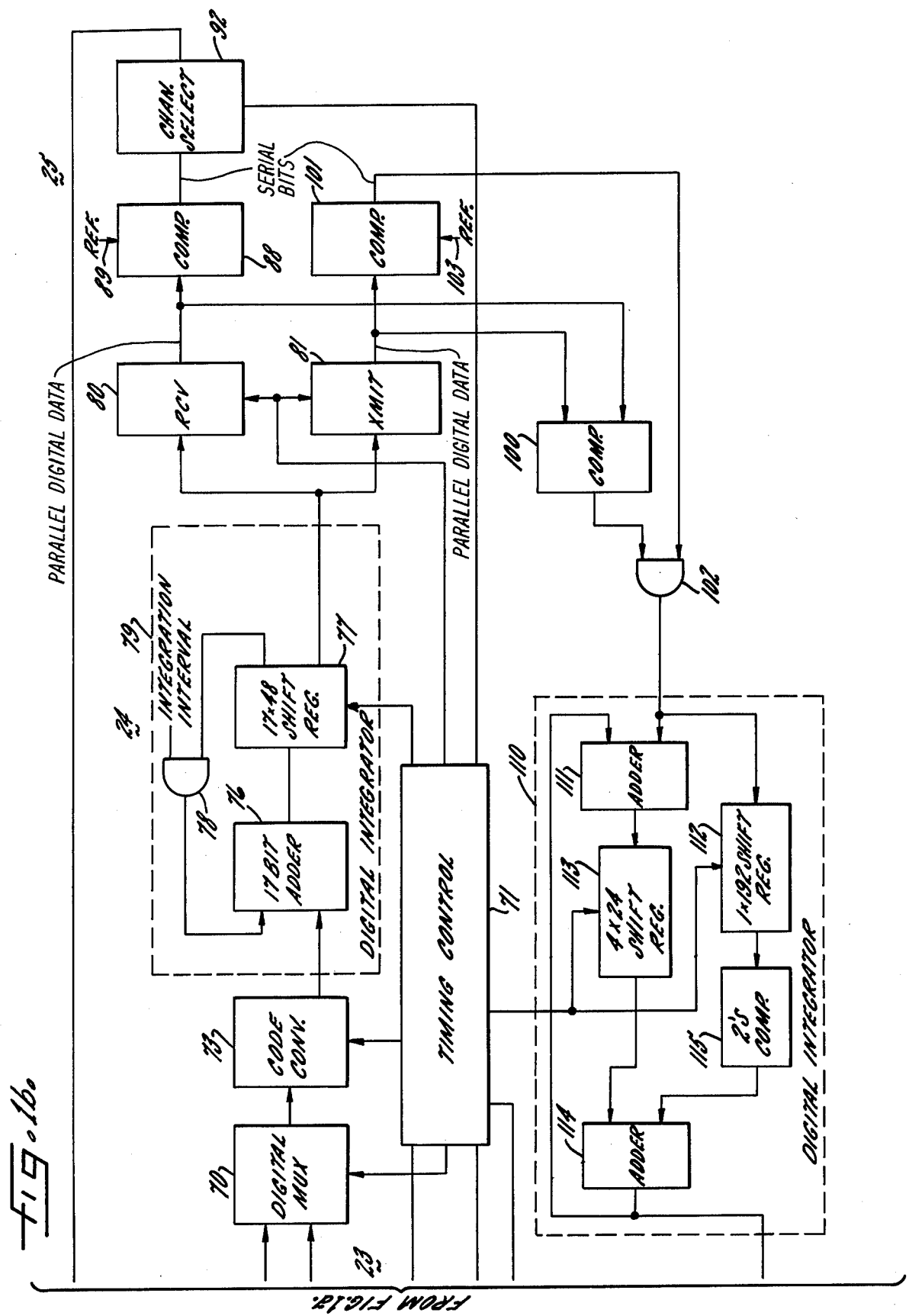

DIGITAL ECHO SUPPRESSOR

This invention relates to echo suppressors, and more particularly to multi-channel echo suppressors operating on digital principles.

Long distance communications systems which are four wire in nature, utilize separate transmit and receive lines for communicating unidirectional signals between two points. When it is necessary to convert the four wire system to a two wire system, such as at the central office or terminal ends, a hybrid is interposed in the circuit for converting the separate transmit and receive signals to bidirectional signals on the two wire pair. Because the hybrid is generally incapable of precisely matching the impedance of the two wire line connected thereto, a portion of the energy imposed on the receive port is reflected into the transmit port. As the length of the transmission system is increased, the time delay between the speech and the reflection in the four wire circuit causes a perceptible echo which is objectionable and often confusing to the speaker. Echo suppressors are installed in the four wire transmission system for attenuating the echo thereby to alleviate this problem.

Generally stated, an echo suppressor is a device which is placed in the four wire portion of a long distance telephone circuit for inserting loss into the return or echo path to suppress or reduce echo signals. Split echo suppressors, the type with which we are concerned herein, are utilized in pairs, one being installed at each end of the long distance transmission system, the near end speaker being protected by the far end echo suppressor and vice versa. For example, when the near end speaker is receiving a signal but not transmitting, the echo suppressor detects the received signal and in response thereto inserts a large attenuation, such as 60 db into the near end transmit channel. This is known as suppression. If the near end speaker begins to speak, break-in will be accomplished if the speech signal he generates becomes equal to or exceeds the received signal. In this case, a smaller attenuation pad, such as 6db, is inserted into the near end receive path while the large suppression attenuator is removed from the transmit path. Timing circuits are generally associated with the suppression and break-in attenuators for controlling the hangover time in accordance with the requirements of the particular transmission system. For example, the hangover times are generally increased with increasing length of the transmission system, with the longest times being associated with satellite communications.

Analog echo suppressors have been in use for a number of years and have provided performance which in some cases is adequate. However, because of their analog nature they inherently have problems of drift and the like, and are thus difficult to maintain in adjustment over a period of time, optimum performance requiring periodic "retuning." To avoid this problem, digital echo suppressors have been suggested, eliminating as many of the analog components as possible, and processing the signals in digital format. However, the previously suggested digital echo suppressors have not been without their own shortcomings. For example, the digital echo suppressors proposed heretofore have emphasized either time sharing of digital processing components among a plurality of channels but at the expense of accuracy, or accuracy comparable to an analog echo suppressor, but with little, if any, time sharing of the digital processing circuitry.

U.S. Pat. Nos. 3,562,448 to May, 3,673,355 to LaMarche and 3,823,275 to LaMarche illustrate the common control approach. It is seen that those systems fail to utilize the potential accuracy achievable with the digital approach. May digitizes the analog signals into only six discrete levels, and LaMarche discards the accuracy in an eight bit PCM code to generate a four bit code for comparison purposes. Rather than accurately digitizing the analog signals and processing the accurately digitized samples, those patents rely upon a relatively complex statistical approach, assigning status levels within a predetermined hierarchy to the various lines for controlling attenuation in those lines.

U.S. Pat. Nos. 3,821,494 to Besseyre and 3,906,172 to Hoeschelle illustrate the adoption of the analog approach in a digital echo suppressor wherein the echo suppressor is adapted to serve only a single transmit and receive channel. The Campanella U.S. Pat. No. 3,937,907 is disclosed in the context of a single channel echo suppressor, and uses an eight bit digital code capable of providing accuracy comparable to conventional analog echo suppressors. The approach used therein assigns positive or negative signs to the digitized samples in dependence upon their origin (transmit or receive line) and performs digital algebra upon those signed samples. Because the digital algebra of this approach requires complementing of some of the digital numbers, ambiguities exist, for example at the zero signal level, requiring additional circuitry to prevent false operation. While Campanella does suggest time sharing operation using his basic approach, it is evident from the suggestion that the time sharing contemplated is somewhat limited as to the number of possible channels and the number of components to be shared.

In view of the foregoing, it is a general aim of the present invention to provide a mult-channel digital echo suppressor using common digital circuitry capable of servicing a plurality of paired transmit and receive lines, and providing accuracy equal to or better than conventional analog echo suppressors. More specifically, an object of the present invention is to provide a digital echo suppressor wherein a plurality of paired transmit and receive lines are scanned, the analog signals thereon being accurately digitized, and the digitized signals operated upon directly and in sequence by common circuitry for controlling echo suppression in the respective channels.

A detailed object of the invention is to provide a multi-channel digital echo suppressor wherein the analog signals on a plurality of paired transmit and receive lines are sampled and digitized in sequence, the resulting parallel digital words being stored in sequence for operation upon by common digital circuitry, the circuitry serving to relate samples from the same line to each other while treating samples for all the lines separately but in interleaved sequence. It is a further object in such a digital echo suppressor to accumulate a predetermined number of digital samples for each of the lines while continuously circulating the accumulated samples but operating thereon in such a way that subsequent samples for any channel are accumulated only with the prior accumulated sum for that channel.

According to another aspect of the invention, it is an object to control break-in in a digital echo suppressor by bringing the accumulated sequentially stored samples for associated transmit and receive lines into time correlation for comparison thereof to produce a sequence of break-in control signals for the plurality of channels. In order to avoid premature entry into the break-in mode, it is an object to continuously monitor $n$ sequential samples for each channel and to generate a break-in control signal for that channel only when a predetermined proportion of the $n$ samples indicate the need for break-in. According to this aspect of the invention, it is an object to provide a moving window scanner adapted to monitor all of the break-in signals as they are generated, but to respond to the most recent $n$ sequential signals from each channel to generate interleaved break-in operating signals for distribution to respective break-in controllers.

Other objects and advantages will become apparent from the following detailed description when taken in conjunction with the drawings in which:

FIGS. 1a and 1b when joined form a block diagram of a digital echo suppressor exemplifying the present invention.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Turning now to the drawings, there is shown in block diagram form a multi-channel digital echo suppressor exemplifying the present invention. The echo suppressor includes a plurality of channel units for sampling and controlling the analog signals on paired transmit and receive lines in sequence, channel units 20 and 20a for channels 1 and 2 respectively being illustrated. The channel units couple the sampled analog signals to pulse amplitude modulated (PAM) bus 21 or 22, PAM bus 21 receiving the samples from all of the odd numbered channel units represented by unit 20 and PAM bus 22 receiving the samples from all of the even numbered channel units represented by unit 20a. A digitizing section 23 digitizes the PAM signals on the buses 21, 22 to produce a plurality of digital words, indicating the magnitudes of the signals sampled on each of the transmit and receive lines. The digitizing section 23 is connected to a digital multiplexer and accumulator section 24 which interleaves the digital words for all of the channels and accumulates a predetermined number of absolute value samples for each line while maintaining the accumulated samples in interleaved sequence. A processing section 25 receives the sequential accumulated samples and segregates those samples into separate paths wherein the interleaved receive signal samples follow a first path and the interleaved transmit signals samples follow a second path. In the processing section 25 the receive and transmit accumulated samples for each channel are brought back into time correlation so that they may be compared to each other and against predetermined digital reference thresholds to produce a series of break-in and suppression control signals. The break-in control signals are monitored in a moving window scanner or digital integrator to generate a series of break-in operating signals, the logical significance of which indiates whether break-in is or is not required for each of the channels. Distribution circuitry distributes the suppression control signals and break-in operating signals to associated suppression, break-in and receive pad controllers in the respective channel units for controlling the insertion and removal of suppression and break-in attenuation in the lines associated therewith.

In the illustrated embodiment only two analog channels are shown, a first channel comprising transmit line 30 and associated receive line 31, and a second channel comprising transmit line 32 and its associated receive line 33. Interposed in the transmit line 30 intermediate an input terminal 35 and an output terminal 37, is a suppression gate 39. As is well known, the suppression gate 39 disables the transmit path when suppression is called for by inserting a large attenuation therein, such as 60 db, and removes the suppression to enable the path when suppression is not required. Interposed in the receive line 31 intermediate an input terminal 42 and an output terminal 44 is a receive pad 46. Just as in the case of analog echo suppressors, when break-in occurs, the associated suppression attenuator is removed from the transmit path while the receive pad is inserted into the corresponding receive path. The second channel comprising transmit line 32 and receive line 33, as well as the remaining channels represented thereby, include suppression and receive pad attenuators, just as the channel just described.

The transmit output terminals, e.g. 37 and the receive input terminals, e.g. 42 are connected to associated four wire transmission circuits for communication with a distant station. The transmit input terminals, e.g. 35 and the receive output terminals, e.g. 44, are connected to local equipment, such as respective hybrids for converting four wire signals on the transmit/receive channel into two wire signals such as required for a subscriber loop.

For preventing signal reflections from being echoed to the distant station, the digital echo suppressor is adapted to monitor the analog signals on the associated transmission channels and to control the suppression and break-in attenuators therein, in response to the levels of the monitored signals. Although only two transmission channels are shown in the drawing, it will become apparent that the illustrated embodiment is capable of operation with 24 transmission channels, that is 48 separate signal carrying lines. it will be appreciated, however, that this embodiment is merely illustrative, and that a greater or lesser number of lines may be handled. With this fact in mind, the illustrated embodiment will be described with specific timing, register size, etc. capable of servicing 24 full channels, realizing that the numerical limitations are offered by way of example rather than limitation.

The illustrated digital echo suppressor relies upon the technique of analog multiplexing followed by digitizing of the multiplexed analog signals. In this embodiment each channel unit includes a two input analog multiplexer 52, 53, etc., 12 of such multiplexers feeding the odd channel PAM bus 21 and an additional 12 multiplexers feeding the even channel PAM bus 22. The input signals for the multiplexers are derived via appropriate bandpass filters, e.g. filters 60 and 61 of channel unit 20, from the transmit and receive lines of the associated channel, the filters passing signals in the band established by appropriate standards for operation of echo suppressors. It is preferred that both the transmit and receive lines for any given channel be serviced by the same analog multiplexer, as well as by the same analog to digital encoder so that any drift associated with these circuits will affect both transmit and receive signals for a channel in the same manner, allowing the resulting digital signals to be effectively and accurately compared.

Multiplexer timing is controlled by individual timing controllers, e.g. channel timing modules 64, 65 in channel units 20, 21a respectively, the individual controllers responding to main timing control 71 for time multiplexing the analog samples onto the PAM buses 21, 22. The PAM buses 21, 22 are connected to analog to digital encoders 50, 51 respectively which serve to digitize the sequentially presented PAM samples. Two encoders are used in the illustrated embodiment to provide sufficient channel handling capacity without unduly increasing the operating speed required of the encoders.

In one construction of the illustrated embodiment, the analog to digital converter used is a non-linear digital encoder of the type disclosed in Brokaw and Chin U.S. Pat. No. 3,882,484. That encoder is constructed to sequentially digitize 24 PAM samples in a companding analog to digital converter to produce respective eight bit digital words indicative of the magnitudes of the sampled analog signals. The output of the analog to digital converter is in D3 PCM code format which is an eight bit non-linear folded binary code. As is known, folded binary is a digital code wherein all positive and negative signals are digitzed in an absolute value format, seven of the bits in the instant encoder indicating the absolute value, and the eighth bit the sign associated therewith. As will become more apparent after discussion of the digital integrator, it is advantageous to provide a digital code which indicates the absolute value of the analog signal, so that the sign may be disregarded for integration.

The aforementioned analog to digital converter is capable of converting a signal sample to a digital representation in approximately 5.2 microseconds. Rather than attempt to double the operating speed of the converter, the illustrated embodiment uses two of such converters operating side by side so as to double the number of channels which may be handled without increasing the speed of the converter. Using two converters working concurrently, it is possible to digitize 24 complete transmit and receive channels in approximately 125 microseconds. Thus, each channel can be sampled at an 8 kHz rate, a rare completely acceptable for reconstructing analog signals in the voice frequency range.

Timing control 71 is associated with the multiplexing and digitizing circuitry for providing the necessary timing. The timing control 71 provides signals to all of the channel units for causing them to sequence through all of their associated transmit and receive lines. Similarly, the analog to digital encoders 50, 51 are operated at appropriate points of the sequence to accept the samples from the analog multiplexers for digitization. Using encoders of the aforementioned Brokaw and Chin type, the elements just described produce eight bit digital words representing the sampled analog signals on a 5.2 microsecond per sample period.

Before discussing the accumulation circuitry, it should be noted that other forms of multiplexing and digitizing techniques may be utilized. For example, it may be possible to utilize separate analog to digital converters for each channel and perform all of the multiplexing digitally. However, even in this case, it is preferred to use the same converter for both the transmit and associated receive lines of a channel to eliminate the effects of drift and offset. As a further alternative, one of the encoders such as 51 may be eliminated so that only a single encoder is utilized and the sampling rate and number of channels arranged to provide the requisite accuracy of detection. In addition, it may also be possible in certain applications to utilize linear analog to digital conversion techniques.

Means are provided for interleaving the digital words produced by the encoders 50, 51 to provide a continuing repeating sequence of samples from all of the channels, such means being shown herein as digital multiplexer 70. Because two multiplexing encoders are utilized, it is apparent that the digital multiplexer 70 must operate at twice the rate of the converters 50, 51 or, in the illustrated embodiment, on a 2.6 microsecond period. The multiplexer 70 is operated in response to signals from timing control 71 to alternately accept digital output words from the encoders 50 and 51, thereby providing a single interleaved sequence of digital words indicating the magnitudes of the analog signals on all of the lines. Assuming that the system is configured to sample odd numbered channels before even, and transmit lines before receive, the output of the digital multiplexer 70 will be a sequence of parallel digital words indicative of the magnitude of the samples on the channels in the following sequence, wherein T indicates transmit and R receive: T1, T2, R1, R2, T3, T4, R3, R4 . . . T23, T24, R23, R24, at which point the entire sequence repeats.

Because the illustrated embodiment utilizes a companding encoder, it is necessary to convert the non-linear output code to linear format before accumulation of samples. To that end, a seven bit non-linear to thirteen bit linear encoder 73 (the eighth sign bit of the non-linear code being ignored) is interposed between the output of the digital multiplexer 70 and the input of a digital integrator 79. The code converter 73 may be configured as a ROM for accepting the non-linear output from multiplexer 70 and in response thereto producing a 13 bit linear digital word. This aspect of the disclosed embodiment illustrates one of the advantages of utilizing a companding encoder, namely, the ability to achieve 13 bit accuracy in an encoding time compatible with eight bit encoding. If the encoder were configured as a 13 bit linear encoder, it would be necessary to either increase the encoding rate or decrease the sampling rate or number of channels serviced. The companding characteristic of the illustrated encoder is also advantageous in providing high resolution at low and medium signal levels where the accuracy is required, so that the suppression decision can be made for signals just above the noise level, and the break-in decision can also be accurately made even at low signal levels.

In order to produce an accurate indication of the signal levels existing on the various lines, a plurality of the digital samples are accumulated for each channel, such accumulated samples serving as the basis for further processing. To that end digital integrator 79 comprising digital adder 76 which, in the illustrated embodiment is of 17 bits, and shift register 77, also of 17 levels, are provided. The shift register 77 is constructed to be 48 digital words in length (each word of 17 bits) so that it is capable of storing a complete set of accumulated samples for all of the lines. The output of the register 77 is recirculated to a summing input of adder 76 by an array of 17 recirculating gates, represented by AND gate 78. By virtue of the fact that the register 77 has a length corresponding to the number of lines being sampled, each time the digital sample for a given line appears at the output of code converter 73, the accumulated magnitude of prior signals on that very line is recirculated by the gate 78 so that the magnitude of the new sample is added to the prior accumulated samples for that line and stored in the register 77. The timing control 71 sequences the associated elements so that an interleaved sequence of accumulated samples is continuously circulated through the shift register 77. For determining the number of samples for each channel to be accumulated before initiating a new accumulation, the second input of the multi-level recirculating gate 78 is driven by an enabling signal, shown on the drawing as indicated to be an integration interval. The integration interval signal is maintained high for 1.875 milliseconds out of each 2 millisecond frame, and is then driven low so that the gate is disabled for the remaining 125 microseconds. Recalling that a complete scan of all of the lines is accomplished in 125 microseconds, it will be appreciated that the illustrated circuit is adapted to accumulate 16 samples for each channel, then begin a new accumulation. During the 125 microsecond disable period, the output of the shift register 77 is a series of parallel digital words indicative of the magnitudes of 16 accumulated samples for each line. As the accumulated samples are shifted out of the register 77, new accumulations, initially comprising only a single sample, replace those signals for subsequent recirculation and further accumulation. In effect, by virtue of the relatively high scanning rate and the accurate digitization, the circuitry just described serves to digitally integrate the magnitudes of the sampled signals for each line over a 2 millisecond period.

In accordance with one aspect of the invention, the interleaved samples are split into separate paths for the transmit and receive signals and the accumulated samples for associated channels brought into time correlation for comparison. To that end, a pair of registers 80, 81 have their inputs connected to the output of the shift register 77 and are driven by timing control 71 so that the register 80 accepts all of the receive channel accumulated samples while the register 81 accepts all of the transmit channel accumulated samples. The registers 80, 81 are clocked by the timing control 71 in such a manner as to accept the output of register 77 only during the 125 microsecond interval of each 2 millisecond frame when the output of register 77 represents 16 accumulated samples. Because the transmit samples precede the receive samples in the interleaved sequence (i.e. T1, T2, R1, R2 etc.) the transmit register 81 includes a buffer stage, clocked by timing control 71, to delay the transmit samples for bringing them into time correlation with their associated receive samples at the register outputs e.g. R1 and T1 accumulated samples are concurrently present at the outputs of registers 80, 81 respectively.

The output of the register 80 is provided to the input of a digital comparator 88 whose second input is connected to a fixed digital reference indicated at 89. The output of the comparator will be of a first logical significance, such as a binary 1, when the sample exceeds the reference, or of a second logical significance, such as a binary 0, when the sample is equal to or less than the reference. The reference 89 is selected to be a digital code which is equivalent to an analog signal threshold level (e.g. −31 dbm0 as specified by CCITT recommendation G161). Because this reference is digital, it is not subject to the drift and temperature variation constraints of analog echo suppressors, allowing the accuracy of the comparison to be improved to ±0.5 db of the reference instead of the ±1.5 db limitation of analog units. A comparison for any channel indicating the accumulated samples to be above the reference level produces an output signal whose significance indicates that suppression is required. That is, the processed signals indicate that intelligence is being received on the receive line, such as line 31, and that the appropriate attenuator 39 should be inserted in the related transmit line 30, to prevent echos from being returned to the distant end. In effect, the output of the comparator will be a series of 24 digital bits (suppression control signals) indicating whether suppression is or is not required for each of the 24 channels.

Recalling that the output of the register 77 represented 16 accumulated samples for each channel for only 125 microseconds of each 2 millisecond frame, it will be appreciated that the output of the comparator will be a 125 microsecond burst of digital bits forming suppression control signals for all of the channels, such burst being repeated every 2 milliseconds. These suppression control signals are shifted into a channel select register 92 under the control of timing control 71, and are updated every 2 milliseconds. Thus, the channel select register 92 contains 24 bits indicating for each of the 24 channels whether suppression is or is not required. The bits within the channel select register 92 are routed to the associated suppression controllers so that the associated suppression gates may be actuated in dependence upon the binary significance of the bit. More specifically, timing control 71 drives the individual channel timing units 64, 65 etc. so that the suppression controller for any given channel is activated to receive a suppression control signal at the time the suppression control signal for that channel is present at the output of channel select register 92. For example, if the comparator shifted a binary 1 indicating a suppression was required into the stage in register 92 associated with the channel unit 20 (channel 1), the timing control 71 would cause that binary 1 to appear at the output of register 92 at the same time that channel timing unit 64 was actuated to cause suppression controller 93 to receive a suppression control signal, so that the suppression gate 39 in channel unit 20 would be opened. The gate would remain open under the control of suppression controller 93 for so long as the digital circuitry continued to generate binary 1 suppression control signals for channel 1. If later the signal on the receive line as processed by the digital circuitry causes the output of the comparator to become a binary 0 indicating that suppression is no longer required for channel 1, that binary 0 would be shifted into the appropriate stage of register 92 to deactivate the suppression controller 93. The suppression gate 39 would then be closed to remove the attenuation from the transmit line 30 after an appropriate hangover time determined by timing circuitry within the controller 93, the hangover time being related to the length and type of transmission facility. While the full complement of 24 channel units has not been shown in the drawings, it will be apparent that all of the channel units are constructed like the illustrated units 20 and 20a, and are timed to operate in their assigned time slot to share the common digital processing circuit.

Having brought the accumulated samples for associated transmit and receive lines of the various channels into time correlation at the outputs of the registers 80, 81, a comparator 100 is provided to compare those signals to each other to determine whether the break-in mode should be entered. If the comparator 100 determines from the processed digital signals that the accumulated samples for the transmit line are greater than or equal to the accumulated samples during the same period for the associated receive line, such comparator produces a logic 1 at its output indicating that break-in is required. A second comparator 101 samples the transmit accumulated samples and compares them to a fixed digital threshold reference 103 to prevent entry of the break-in mode when the transmit level is below threshold. This insures that when both the transmit and receive signals are below threshold no break-in can occur and both the suppression and receive pads are removed. If the transmit signal is above the threshold reference, and is greater than or equal to the accumulated receive signals, both inputs of an AND gate 102 will be satisfied, causing the output of that AND gate to generate a break-in control signal for the channel just sampled. Because the accumulated samples for all of the channels are provided to the comparators in sequence, the output of AND gate 102 will be a sequence of digital bits (break-in control signals) indicating whether break-in is or is not required for each of the 24 channels. The output of AND gate 102 is a 125 microsecond burst of information containing the break-in control signals for all 24 channels, and is updated every 2 milliseconds.

In contradistinction to the suppression control signals which were routed directly to the suppression controllers, the break-in control signals are monitored in such a way that the break-in controller is actuated only when a predetermined number of break-in control signals for a given channel indicate the need for break-in. This feature is important to assure that the near end party is indeed attempting to speak in the presence of a received signal before the suppression attenuation is removed from the transmit path and the break-in attenuator inserted in the receive path. Accordingly, a moving window scanner generally indicated at 110 is adapted to monitor the status of the last $n$ break-in control signals for each channel and to produce break-in energizing signals of appropriate logic significance (such as a binary 1) when a predetermined number of the $n$ signals indicate that break-in is required. The moving window 110 accummulates the last $n$ control signals for each channel separately but in sequence so as to produce a serial digital output signal indicating whether the break-in mode should or should not be energized for each of the channels. As a new break-in control signal is generated by the AND gate 102 for a channel, that signal is accumulated along with the last $n$-1 signals previously generated so that the content of the moving window always reflects the last $n$ samples for each channel. With the timing relationships described above, the illustrated moving window 110 is adapted to monitor the status of all of the break-in control signals generated within the last 16 milliseconds, and to indicate, on a channel by channel basis, the status of each channel for that period.

The moving window scanner 110 includes a first adder 111 having a summing input coupled to AND gate 102 for receiving break-in control signals generated by the comparators 100, 101. The break-in control signals are simultaneously applied to a delaying shift register 112 for purposes to be described below. The output of the adder 111 is coupled to a shift register 113 which comprises four levels to accommodate the maximum possible accumulation for each channel, and 24 stages to accommodate the 24 channels. The output of the register 113 is coupled to a summing input of a second adder 114 whose output in turn is returned to the second summing input of the adder 111. With the circuitry described thus far, each time a newly generated break-in control signal for a given channel is presented to the adder 111, the previous accumulation of such signals for that channel is recirculated to the second input of the adder 111, so that the adder output shifted into the register 113 represents the new accumulation.

In order to maintain the status within the moving window current, means are provided for discarding the oldest signal for a channel when a new signal is generated on a channel by channel basis. To that end, the second summing input of the adder 114 is driven by the output of the shift register 112 via a two's complement stage 115. In the illustrated embodiment, the shift register 112 is one bit by 192 stages so as to accommodate 8 complete sets of break-in control signals. Thus, as a new sample is generated to be added to the previously accumulated sum in the adder 111, the oldest sample has been shifted through the shift register 112 and two's complemented by module 115 so as to be subtracted from the accumulation in the adder 114. As an example, considering sample 1 as the oldest sample and sample 9 as newly generated for a particular channel, when sample 9 is generated, the registers 112, 113 will be shifted applying the accumulation of samples 1–8 and the two's complement of sample 1 to adder 114. The output of the adder 114 is therefore the accumulation of samples 2–8 for the particular channel, and is recirculated to adder 111 for addition to sample 9. Thus the output of adder 111 represents the accumulation of samples 2–9 and is shifted into register 113. It will now be apparent that the output of adder 111 represents the eight most recent samples while the output of adder 114 represents seven of the eight most recent samples for each channel, and that these accumulations are continually updated on a channel by channel basis as new samples are generated.

Means are provided for sequentially comparing the monitored status of the break-in control signals within the moving window scanner 110 against a predetermined reference in order to generate a break-in energizing signal for a given channel when a sufficient number of break-in control signals indicate that break-in is indeed required. Assuming that a logic 1 break-in control signal indicates the need for break-in, an accumulation of 8 at the output of adder 111, or 7 at the output of adder 114, will indicate that all of the monitored samples for that channel require break-in. An indication of a lesser number will indicate that some, but not all of the samples for that channel require break-in. The output of adder 114 is coupled to one of the inputs of comparator 117 for making a decision, based upon the accumulated samples, as to whether break-in should or should not be inserted for each of the channels. The second input of the comparator 117 is coupled to a fixed digital reference 118 which, in the illustrated embodiment, may be set at the number 5. The comparator 117 is constructed to produce a 1 output when the accumulated break-in signals are equal to or greater than the reference so that as soon as the accumulation for any channel reaches 5, the comparator will produce a logical output indicating the need for break-in in that channel. Because of the sequential operating mode of the moving window scanner and the comparator 117, the output of the comparator will be a series of pulses forming break-in energization signals for each of the channels indicating whether break-in is or is not required for each channel. These signals are shifted into a channel select register 121, similar to the register 92 which acts in conjunction with the main timing unit 71 and the channel timing units 64, 65 etc. to route the appropriate bits to associated break-in controllers and receive pad controllers for each of the channels, such as controllers 122 and 123 in channel unit 20. A logic 1 in the stage of the select register 121 associated with the channel unit 20a will be routed by the aforementioned timing circuitry to break-in controller 122 and receive pad controller 123 of channel unit 20 to trigger the timers internal to those controllers and cause the echo suppressor to go into the break-in mode. In the break-in mode, the break-in controller 122 serves to remove the suppression loss from the transmit line while receive pad controller 123 serves to insert the break-in pad 46 into the receive line 31. So long as the comparator 117 continues to indicate that break-in is required for the particular channel, the controllers 122 and 123 will maintain the circuit in the break-in mode. When the appropriate bit in the channel select register 121 indicates that break-in is no longer required, the timers within controllers 122 and 123 will begin to time out, and at the end of associated hangover times will reinsert the suppression loss into the transmit line 30 and remove the break-in pad from the receive line 31. Because the break-in and receive pad controllers are both operated during break-in, they are sometimes referred to collectively herein as break-in controllers. It will be apparent similar break-in controllers are provided in each of the 24 channels units and are driven by the common digital circuitry.

In the illustrated embodiment, the comparator 117 responds to the output of adder 114 and thus requires that five of the seven samples represented at the output of such adder dictate break-in before break-in will be actuated. It is also possible to connect the input of comparator 117 to the output of adder 111 so that the comparator may respond to the status of all eight samples monitored by the moving window, break-in being activated for any channel when five of the last eight scans of that channel dictate the need for break-in.

In addition to the echo suppressor circuit described in detail above, there has also been provided a novel method of controlling echo in paired transmit and receive lines, and usable with a plurality of such paired lines. Initially, the analog signals on the lines are sampled in a predetermined sequence to produce digital words indicating the absolute values of the sampled magnitudes. These digital words are interleaved in a serial sequence for further processing. A predetermined number of successive samples are accumulated for each channel while keeping the accumulated samples for all the channels in series interleaved fashion. The accumulated samples are then segregated into separate transmit and receive paths and the transmit and receive signals for the respective channels are returned to time correlation and compared on a channel by channel basis to produce break-in control signals in sequence for all of the channels. Break-in controllers associated with the respective channels are actuated in dependence on the break-in control signals generated therefor. In addition to the break-in comparison, the accumulated receive line samples are compared against a predetermined digital reference to generate a series of suppression control signals for the channels. Suppression controllers associated with the respective channels are actuated in dependence upon these suppression control signals. In order to assure that break-in is actually required before actuating same, the last $n$ break-in control signals for each of the channels are monitored in a moving window scanner, and the break-in controllers are actuated only when a predetermined proportion of the $n$ signals indicate the need for break-in.

It will now be appreciated that what has been provided is an improved multi-channel digital echo suppressor having accuracy surpassing presently known analog echo suppressors and economically achieving digital signal processing via time shared circuitry. Because the circuit configuration can maintain high sampling rates for a large number of channels while still keeping the data for each channel isolated from that of the others, suppression attack time, determined mainly by the integrating period of the digital integrator 79 and the delay of channel select register 92 is between 2.3 and 4.4 milliseconds, well within the required standards. By virtue of the moving window 110 break-in is actuated only in cases where it is actually needed without severely increasing the break-in attack time, such attack time falling within the range between 12.3 and 18.3 milliseconds. In addition, because associated transmit and receive samples, even though sampled in sequence, are returned to time correlation, their magnitudes may be directly compared, allowing the signs associated with the samples to be ignored, and obviating the need for complementing or the like.

We claim as our invention:

1. A multi-channel digital echo suppressor for use with a plurality of paired transmit and receive lines comprising: suppression controllers and break-in controllers associated with the respective channels, means for producing a sequence of digital words indicating the absolute values of the signals on each of the lines, accumulating means for accumulating a plurality of digital words for each line, said accumulating means so constructed and arranged as to recirculate the accumulated digital words while keeping said accumulated words for the different lines interleaved but separate, means for segregating the accumulated receive line digital words from the accumulated transmit line digital words and bringing the words for the paired lines into time correlation, first comparison means responsive to the accumulated receive line words and a reference for producing suppression control signals in sequence for all of the channels, second comparison means responsive to the accumulated receive line words and the accumulated time correlated transmit line words for producing break-in control signals in sequence for all of the channels, selector means for distributing the suppression control signals and the break-in control signals to associated ones of the suppression controllers and break-in controllers respectively, whereby the digitized signals are processed by common circuitry to control echo suppression and break-in in the associated channels.

2. The echo suppressor as set forth in claim 1 wherein said accumulating means comprises a multi-level adder having first summing inputs receiving said sequential parallel digital words, multi-level multi-stage shift register means for receiving the output of the adder and maintaining the accumulated words in interleaved fashion, and recirculating means for coupling the output of the shift register means to a second summing input of said adder, the number of stages of said shift register being equal to the number of transmit and receive lines whereby the accumulated sum is presented to the adder in conjunction with a successive word from the same line, and means for periodically reinitiating a new accumulation.

3. The digital echo suppressor as set forth in claim 1 wherein the segregating means comprises first and second registers, and timing means for causing said first register to accept only receive line accumulated words and said second register to accept only transmit line accumulated words.

4. The digital echo suppressor as set forth in claim 1 wherein said means for producing a sequence of digital words includes a pair of companding analog to digital encoders, register means for interleaving the outputs of said encoders, and code converter means for converting said outputs from companded to linear format.

5. The digital echo suppressor as set forth in claim 1 wherein the selector means includes moving window means for continuously monitoring $n$ sequential break-in control signals for each channel, said moving window means including comparator means for energizing the associated break-in controller only when a predetermined proportion of the $n$ break-in control signals for a channel dictate break-in.

6. The digital echo suppressor as set forth in claim 1 further including moving window means for continuously monitoring the status of $n$ successive break-in control signals for each channel and means for sequentially comparing the status of the $n$ break-in control signals for each channel to a predetermined reference and producing a sequence of break-in energizing signals in response thereto, said break-in energizing signals being coupled to said selector means for distribution to the respective break-in controllers.

7. The digital echo suppressor as set forth in claim 6 wherein $n$ is 8, the predetermined reference of said sequential comparing means establishing a threshold status for each channel which, when exceeded causes the sequential comparing means to produce a break-in energizing signal of a first state, and when not exceeded of a second state.

8. The digital echo suppressor as set forth in claim 1 wherein said second comparison means produces an output of a first state for channels where the accumulated transmit line words are greater than or equal to the accumulated receive line words, and of a second state for channels where the accumulated transmit line words are less than the accumulated receive line words, the first state serving to dictate break-in.

9. The digital echo suppressor as set forth in claim 8 wherein the second comparison means further includes means for comparing the accumulated transmit line words against a predetermined threshold thereby to prevent false break-in.

10. The digital echo suppressor as set forth in claim 8 including moving window means for continuously monitoring the status of $n$ successive break-in control signals for each channel, and means for sequentially comparing the state of the $n$ break-in control signals for each channel against a predetermined reference to produce a sequence of break-in energizing signals indicating whether the number of the $n$ break-in control signals of said first state exceeds said predetermined reference, said break-in energizing signals being coupled to said selector means for distribution to the respective break-in controllers.

11. The digital echo suppressor as set forth in claim 1 including moving window means for continuously monitoring the status of $n$ break-in control signals for each channel comprising first adder means having a summing input for receiving said break-in control signals, first shift register means for receiving the output of said first adder means, said first shift register means having a length equal to $x$ wherein $x$ is the number of channels, second shift register means for receiving said break-in control signals, said second shift register means having a length equal to $nx$, complement means coupled to the output of said second shift register means, second adder means having a first summing input coupled to the output of said first register means and a second summing input coupled to said complement means, and means coupling the output of said second adder means to a summing input of said first adder means, and threshold means responsive to the moving window means for generating break-in energizing signals in sequence for the channels, said break-in energizing signals being coupled to said selector means for distribution to the respective break-in controllers, whereby said scanner continuously monitors the status of $n$ break-in signals for each channel and is updated as new break-in control signals are produced.

12. A multi-channel digital echo suppressor for use with a plurality of paired transmit and receive lines comprising, suppression controllers and break-in controllers associated with the respective channels, analog multiplexing means for sampling analog signals on the respective lines, digitizing means responsive to the multiplexing means for producing parallel digital words in sequence indicating the magnitudes of the sampled analog signals for all of the channels, accumulating means responsive to the sequential parallel digital words for accumulating a plurality of samples for each line, said accumulating means including register means for recirculating the accumulated samples keeping the samples for the different lines interleaved but separated, means for segregating the accumulated receive line samples from the accumulated transmit line samples and bringing the accumulated samples for the paired lines into time correlation, first comparison means responsive to the accumulated receive line samples and a reference for producing suppression control signals in sequence for all of the channels, second comparison means responsive to the accumulated receive line samples and the accumulated time correlated transmit line samples for producing break-in control signals in sequence for all of the channels, and selector means for distributing the suppression control signals and break-in control signals to associated ones of the suppression and break-in controllers, whereby the digitized analog signals are processed by common circuitry to control echo suppression and break-in in the associated channels.

13. A multi-channel digital echo suppressor for use with a plurality of paired transmit and receive lines comprising, suppression controllers associated with the respective channels for selectively inserting suppression attenuation into said channels for suppressing echo therein, break-in controllers associated with the respective channels for selectively removing said suppression attenuation and inserting break-in attenuation into the respective channels, first and second PAM buses, means for sampling signals on a first and second group of said transmit and receive lines and time multiplexing the samples onto the first and second PAM buses respectively, first and second analog to digital encoders coupled to the first and second PAM buses respectively for sequentially digitizing the samples thereon and producing sequential parallel digital words indicating the magnitudes of the sampled signals, means for interleaving the sequential digital words from the encoders, accumulating means for receiving the sequential digital words from the interleaving means and accumulating a plurality of said words in the interleaved sequence, timing control means for causing said accumulating means to associate the accumulated samples from the respective lines with subsequent samples from the same lines so that the accumulated samples form a sequence of parallel digital words related to the respective lines, means for segregating said last mentioned parallel digital words into sequential receive line accumulated samples and sequential transmit line accumulated samples and bringing the accumulated receive and transmit samples for the respective channels into time correlation, first comparator means responsive to the time correlated accumulated receive and transmit samples for producing break-in control signals in sequence for the respective channels, second comparator means responsive to the accumulated receive line samples and to a reference for generating sequential suppression control signals for the respective channels, and selector means for operating said suppression controllers and break-in controllers in response to the associated suppression and break-in control signals.

14. The digital echo suppressor as set forth in claim 13 wherein said accumulating means comprises a multi-level adder having first summing inputs receiving said sequential parallel digital words from said interleaving means, multi-level multi-stage shift register means for receiving the output of the adder and maintaining the accumulated samples in interleaved fashion, and recirculating means for coupling the output of the shift register means to a second summing input of said adder, the number of stages of said shift register being equal to the number of transmit and receive lines whereby the accumulated sum is presented to the adder in conjunction with a successive sample from the same line, and means for periodically reinitiating a new accumulation.

15. The digital echo suppressor as set forth in claim 14 wherein the segregating means comprises first and second registers, and timing means for causing said first register to accept only receive line accumulated words and said second register to accept only transmit line accumulated words.

16. The digital echo suppressor as set forth in claim 13 wherein said encoders are companding encoders, and further including code converter means interposed between the interleaving means and the accumulator means for converting the parallel digital words from companded to linear format.

17. The digital echo suppressor as set forth in claim 13 wherein the selector means includes moving window means for continuously monitoring $n$ sequential break-in control signals for each channel, said moving window means including comparator means for energizing the associated break-in controller only when a predetermined proportion of the $n$ break-in control signals for a channel dictate break-in.

18. The digital echo suppressor as set forth in claim 13 further including moving window means for continuously monitoring the status of $n$ successive break-in control signals for each channel, and means for sequentially comparing the status of the $n$ break-in control signals for each channel to a predetermined reference and producing a sequence of break-in energizing signals in response thereto, said break-in energizing signals being coupled to said selector means for distribution to the respective break-in controllers.

19. The digital echo suppressor as set forth in claim 18 wherein $n$ is 8, the predetermined reference of said sequential comparing means establishing a threshold status for each channel which, when exceeded causes the sequential comparing means to produce a break-in energizing signal of a first state and when not exceeded of a second state.

20. The digital echo suppressor as set forth in claim 13 wherein said first comparator means produces an output of a first state for channels where the accumulated transmit line samples are greater than or equal to the accumulated receive line samples, and of a second state for channels where the accumulated transmit line samples are less than the accumulated receive line samples, the first state serving to dictate break-in.

21. The digital echo suppressor as set forth in claim 20 wherein the first comparator means further includes means for comparing the accumulated transmit line words against a predetermined threshold thereby to prevent false break-in.

22. The digital echo suppressor as set forth in claim 20 including moving window means for continuously monitoring the status of $n$ successive break-in control signals for each channel, and means for sequentially comparing the state of the $n$ break-in control signals for each channel against a predetermined reference to produce a sequence of break-in energizing signals indicating whether the number of the $n$ break-in control signals of said first state exceeds said predetermined reference, said break-in energizing signals being coupled to said selector means for distribution to the respective break-in controllers.

23. The digital suppressor as set forth in claim 13 including moving window means for continuously monitoring the status of $n$ break-in control signals for each channel comprising first adder means having a summing input for receiving said break-in control signals, first shift register means for receiving the output of said first adder means, said first shift register means having a length equal to $x$ wherein $x$ is the number of channels, second shift register means for receiving said break-in control signals, said second shift register means having a length equal to $nx$, complement means coupled to the output of said second shift register means, second adder means having a first summing input coupled to the output of said first register means and a second summing input coupled to said complement means, and means coupling the output of said second adder means to a summing input of said first adder means, and threshold means responsive to the moving window means for generating break-in energizing signals in sequence for the channels, said break-in energizing signals being coupled to said selector means for distribution to the respective break-in controllers, whereby said moving window means continuously monitors the status of $n$ break-in control signals for each channel and is updated as new break-in control signals are produced.

24. A moving window scanner for monitoring digital signals, wherein said digital signals are produced in a repetitive sequence, with the signal in any position in the sequence being related to the signals in the same position in all other sequences, said moving window scanner comprising first adder means having a summing input for receiving said digital signals, first shift register means for receiving the output of said first adder means, said first shift register means having a length equal to $x$ wherein $x$ is the number of positions in the sequence, second shift register means for receiving said digital signals, said second shift register means having a length equal to $nx$ wherein $n$ is the number of successive samples of the same position to be scanned by said moving window, complement means for receiving the output of said second register means, second adder means having a first summing input coupled to the output of said first register means and a second summing input coupled to said complement means, and means coupling the output of said second adder means to the summing input of said first adder means, whereby said scanner continuously and separately monitors the status of the last $n$ digital signals in each position in the sequence.

25. A method of controlling echo in paired transmit and receive lines, and usable with a plurality of such paired lines comprising the steps of sampling the analog signals on each of the lines in a predetermined sequence and producing digital words indicating the absolute values of the sampled magnitudes, interleaving said digital words in a serial sequence, accumulating the absolute values for each of the channels for a predetermined period while keeping the accumulated samples in serial interleaved fashion, breaking the accumulated samples into separate transmit and receive paths and bringing the transmit and receive signals for the respective channels into time correlation, comparing the transmit and receive accumulated samples for each channel to produce break-in control signals in sequence for all of the channels, actuating break-in controllers for each of the channels in dependence upon the break-in control signals for those channels, comparing the accumulated receive samples against a predetermined reference to generate a plurality of suppression control signals, and actuating suppression controllers in each of the channels in dependence upon the suppression control signals for those channels.

26. The method as set forth in claim 25 including the step of monitoring the last $n$ break-in control signals for each of the channels separately but in sequence and actuating the associated break-in controllers only when a predetermined proportion of the $n$ signals indicates the need for break-in.

* * * * *